United States Patent [19]

Jacques et al.

[11] 4,109,189

[45] Aug. 22, 1978

[54] PHASE-SENSITIVE TRANSDUCER APPARATUS WITH IMPROVED SIGNAL OFFSET MEANS

[75] Inventors: James O. Jacques, Tracy; Robert Dale Carlson, Danville, both of Calif.

[73] Assignee: Xerox Corporation, Stamford, Conn.

[21] Appl. No.: 737,972

[22] Filed: Nov. 2, 1976

[51] Int. Cl.$^2$ .............................................. G05B 1/02
[52] U.S. Cl. ................................... 318/608; 318/632; 318/656; 318/657; 340/347 SY
[58] Field of Search .............. 318/608, 632, 656, 657, 318/658, 659, 660, 661; 340/347 SY; 324/34 PS, 34 D

[56] References Cited

U.S. PATENT DOCUMENTS

| | | | |
|---|---|---|---|
| 3,588,710 | 6/1971 | Masters ................................. | 318/608 |
| 3,877,024 | 4/1975 | Friday ............................ | 340/347 SY |
| 3,918,045 | 11/1975 | Morser et al. .................. | 340/347 SY |
| 4,010,463 | 3/1977 | Kay ....................................... | 318/661 |
| 4,047,086 | 9/1977 | Cocksedge ........................... | 318/657 |

FOREIGN PATENT DOCUMENTS 368,634  4/1973  U.S.S.R. ........................... 340/347 SY

*Primary Examiner*—Robert K. Schaefer
*Assistant Examiner*—Eugene S. Indyk
*Attorney, Agent, or Firm*—Barry Paul Smith

[57] ABSTRACT

A phase-sensitive transducer apparatus comprises first and second relatively movable members, the first relatively movable member having a plurality of windings and the second relatively movable member having a winding. Means are included for applying a first input signal to one of the windings of the first relatively movable member and a second input signal to another of the windings of the first relatively movable member. An output signal is developed on the winding of the second relatively movable member. The first and second input signals are sinusoidal in nature of substantially identical frequency and peak amplitude and are phase-displaced by a predetermined amount, and the output signal is substantially constant in peak amplitude and variable in phase during relative movement of the first and second relatively movable members. Further means is included which responds to the first input signal and to the output signal for generating a position signal indicative of the relative movement of the first and second relatively movable members, the position signal alternating during such relative movement between first and second voltage levels. Also, additional means is included which responds to the first input signal and to the second input signal for generating a d-c reference signal having a voltage level substantially equal to the voltage level of the position signal when the first input signal and the output signal are phase-displaced by said predetermined amount. Comparator means is included which responds to the position signal and to the d-c reference signal for offsetting the position signal by an amount represented by the voltage level of the d-c reference signal.

19 Claims, 6 Drawing Figures

PHASE-SENSITIVE TRANSDUCER APPARATUS WITH IMPROVED SIGNAL OFFSET MEANS

BACKGROUND OF THE INVENTION

This invention relates to transducer apparatus and, more particularly, to a phase-sensitive transducer apparatus of the type comprising first and second relatively movable members wherein the first relatively movable member has a plurality of windings and the second relatively movable member has a winding, and means for applying a first input signal to one of the windings of the first relatively movably member and a second input signal to another of the windings of the first relatively movable member, an output signal being developed, as by induction, on the winding of the second relatively movable member. In this type of transducer apparatus, the first and second input signals are generally sinusoidal in nature of substantially identical frequency and peak amplitude and are phase-displaced by a predetermined amount (e.g. 90°), and the output signal is substantially constant in peak amplitude and variable in phase during relative movement of the first and second relatively movable members.

Phase-sensitive transducer apparatus of the above type have been used in systems where it is desired to sense and record and/or control movement of a movable element. This is generally accomplished by kinematically coupling one of the two relatively movable members, above defined, to the movable element in order that they are able to move in synchronism. The first relatively movable member may remain fixed and be considered a stator, in the case of a rotary transducer, or a scale, in the case of a linear transducer. Likewise, the second relatively movable member be coupled to the movable element and be considered a rotor, in the case of a rotary transducer, or a slider, in the case of a linear transducer.

Assuming for the purpose of future explanation that the transducer is of the linear type, the output signal from the single slider winding will be phase-modulated in the sense that its peak amplitude will remain constant and its phase will change during movement of the slider relative to the scale. Then, by appropriately demodulating the output signal, a position signal may be derived that is periodic in nature in response to slider movement, wherein each new period of the position signal is indicative of movement of the slider and thus corresponding movement of the movable element. A phase-sensitive transducer apparatus of this general type as used in a position measuring system is disclosed in U.S. Pat. No. 3,191,010.

Phase-sensitive transducer apparatus can also be used in conjunction with a servo control system to control the direction and speed of movement of a movable element. In such context, a means would be provided for deriving a position signal from the slider output signal which alternates during movement of the slider and thus movable element relative to the scale between predetermined first and second voltage levels. In many such servo control systems, velocity information is derived from the position signal, as by differentiation techniques, and both velocity information and position information are used in controlling the direction and speed of movement of a movable element. An example of one such servo system is disclosed in U.S. Pat. No. 3,839,665.

In most contemporary servo systems utilizing a position signal as derived from a transducer apparatus, whether phase or amplitude sensitive, movement of the controlled movable element is generally detected by sensing "zero-crossings" of the position signal. By the term "zero-crossings" in its broader context, it is meant those portions of the position signal which ideally cross an imaginary line half-way between the positive-going and negative-going peaks. In a phase-sensitive transducer apparatus, the position signal would normally alternate between ground or zero voltage and a positive (or negative) peak voltage, thereby making the "zero-crossings" equal to one-half the peak voltage. Consequently, it would be necessary, if a phase-sensitive transducer of this type were used in a servo control system employing "zero-crossing" detection, to carefully adjust the detection system for one-half peak voltage detection. It should be clear that any amplitude fluctuations and offset errors that occur in the position signal would make accurate "zero-crossing" detection extremely difficult, thereby leading to possible servo errors.

Copending U.S. application Ser. No. 670,463 filed on Mar. 25, 1976 now U.S. Pat. No. 4,059,789 in the name of Kenneth W. Cocksedge and assigned to the assignee of the present invention, discloses an improved phase-sensitive transducer apparatus that is capable of offsetting the initially generated position signal by an amount equal to one-half the peak amplitude thereof in order for it to be substantially balanced about a predetermined reference potential, such a ground (zero) voltage. Generally speaking, this is accomplished by using a comparator to compare the initially generated position signal with a d-c reference signal that has a voltage level substantially equal to one-half the peak amplitude of the position signal. The d-c reference signal is derived from the same d-c power supply that is used to establish the peak-amplitude level of the position signal.

As disclosed in the aforesaid application Ser. No. 670,463, the generated position signal is derived by obtaining, through filtering techniques, the d-c average of a pulse signal of constant peak amplitude and variable pulse width that is generated as the slider is moved relative to the scale. Although the phase-sensitive transducer apparatus disclosed in that application has worked quite well, it will be appreciated that errors might occur if the pulses vary substantially from a truly ideal waveform, e.g. they have different rise times than fall times or they do not go all the way to ground due to saturating offsets or the like. In either of these events, the d-c average voltage level of the pulse signal might be different than one-half the peak amplitude at a time when this relationship would normally be true if the pulse signal were idealized in format. More specifically, the d-c average of the pulse signal defines a locus of points during relative movement of the slider and scale, which locus of points constitute the initially generated position signal. Normally, the pulse signal would be expected to have a d-c average voltage level equal to one-half the peak voltage when at a 50% duty cycle. However, if the pulses are not ideal, the d-c average voltage at this duty cycle may be different than one-half the peak voltage.

Since the offsetting reference voltage level in the apparatus of application Ser. No. 670,463 is always equal to one-half the peak voltage, if the pulse signal is not ideal, when it is at a 50% duty cycle the d-c average thereof may not equal one-half the peak voltage. Consequently, when the position signal is offset by one-half the peak voltage, the points on the offset position signal corresponding to a 50% duty cycle of the pulse signal from which the position signal is derived may not occur at a zero voltage level, i.e. the desired condition for truly accurate "zero-crossing" detection. Accurate "zero-crossing" detection is especially important in the case of disk drives, where the zero voltage points of the position signal may be used to define the centers of tracks on the disk.

It would be desirable, therefore, to provide a phase-sensitive transducer apparatus with an improved signal offset means that is substantially insensitive to non-idealities of the waveform of any pulse signal or signals from which the position signal may be derived.

SUMMARY OF THE INVENTION

In accordance with the present invention, a phase-sensitive transducer apparatus is provided comprising first and second relatively movable members, said first relatively movable member having a plurality of windings and said second relatively movable member having a winding, means for applying a first input signal to one of the windings of said first relatively movable member and a second input signal to another of the windings of said first relatively movable member, an output signal being developed on the winding of said second relatively movable member, said first and second input signals being sinusoidal in nature of substantially identical frequency and peak amplitude and being phase-displaced by a predetermined amount, and said output signal being substantially constant in peak amplitude and variable in phase during relative movement of said first and second relatively movable members; means responsive to said first input signal and to said output signal for generating a position signal indicative of the relative movement of said first and second relatively movable members, said position signal alternating during such relative movement between first and second voltage levels; means responsive to said first input signal and to said second input signal for generating a d-c reference signal having a voltage level substantially equal to the voltage level of said position signal when said first input signal and said output signal are phase-displaced by said predetermined amount; and comparator means responsive to said position signal and to said d-c reference signal for offsetting said position signal by an amount represented by the voltage level of said d-c reference signal.

In accordance with the preferred embodiment, the first and second signals are phase-displaced by 90° and the means for generating a position signal comprises a first Exclusive OR-gate having a first input for receiving a squared-up first input signal and a second input for receiving a squared-up output signal. The output of this first Exclusive OR-gate is a pulse signal of substantially constant peak amplitude and variable pulse width as the relatively movable members are moved relative to one another. The means for generating a position signal also includes filter means for supplying a signal constantly representing the d-c average of the pulse signal.

If the pulse signal had an ideal waveform, when the squared output signal reached the point during relative movement of the slider and scale of being 90° phase-displaced with respect to the squared first input signal, the resultant 50% duty cycle of the pulse signal would be manifest at the output of the filter means as a d-c voltage equal to one-half the peak voltage of the pulse signal. If there are imperfections in the pulse signal waveform which result in the d-c average at the 50% duty cycle point being at a different voltage level than one-half the peak amplitude, it is precisely this different voltage which will be used to offset the position signal so that the points thereof corresponding to 90° phase differences between the first input signal and the output signal will nonetheless occur at zero potential.

In accordance with the preferred embodiment, therefore, the means for generating the d-c reference signal comprises a second Exclusive OR-gate, desirably matched with the first Exclusive OR-gate. The second Exclusive OR-gate has a first input for receiving the squared first input signal and a second input for receiving the squared second input signal. Since, in the preferred embodiment, these signals are 90° out-of-phase, the output of the second Exclusive OR-gate will be a pulse signal of substantially constant peak amplitude and constant pulse width with a 50% duty cycle. A filter means coupled to the output of the second Exclusive OR-gate generates a constant d-c reference at a voltage level equal to the voltage level of the initially generated position signal when the first input signal and the output signal are 90° phase displaced, i.e. when the pulse signal at the output of the first Exclusive OR-gate has a 50% duty cycle.

It is thus clear that whatever the d-c average of the pulse signal at the output of the first Exclusive OR-gate when at a 50% duty cycle, it will substantially exactly equal the d-c level of the reference signal so that all points of the offset position signal corresponding to 90° phase-displacements between the first input signal and the output signal will be at zero voltage.

These and other aspects and advantages of the present invention will be more completely described below in connection with the accompanying drawings.

BRIEF DESCRIPTION OF THE DRAWINGS

FIG. 5 is a schematic representation of the position transducer shown in FIG. 1.

DESCRIPTION OF THE PREFERRED EMBODIMENT

Figure 1:
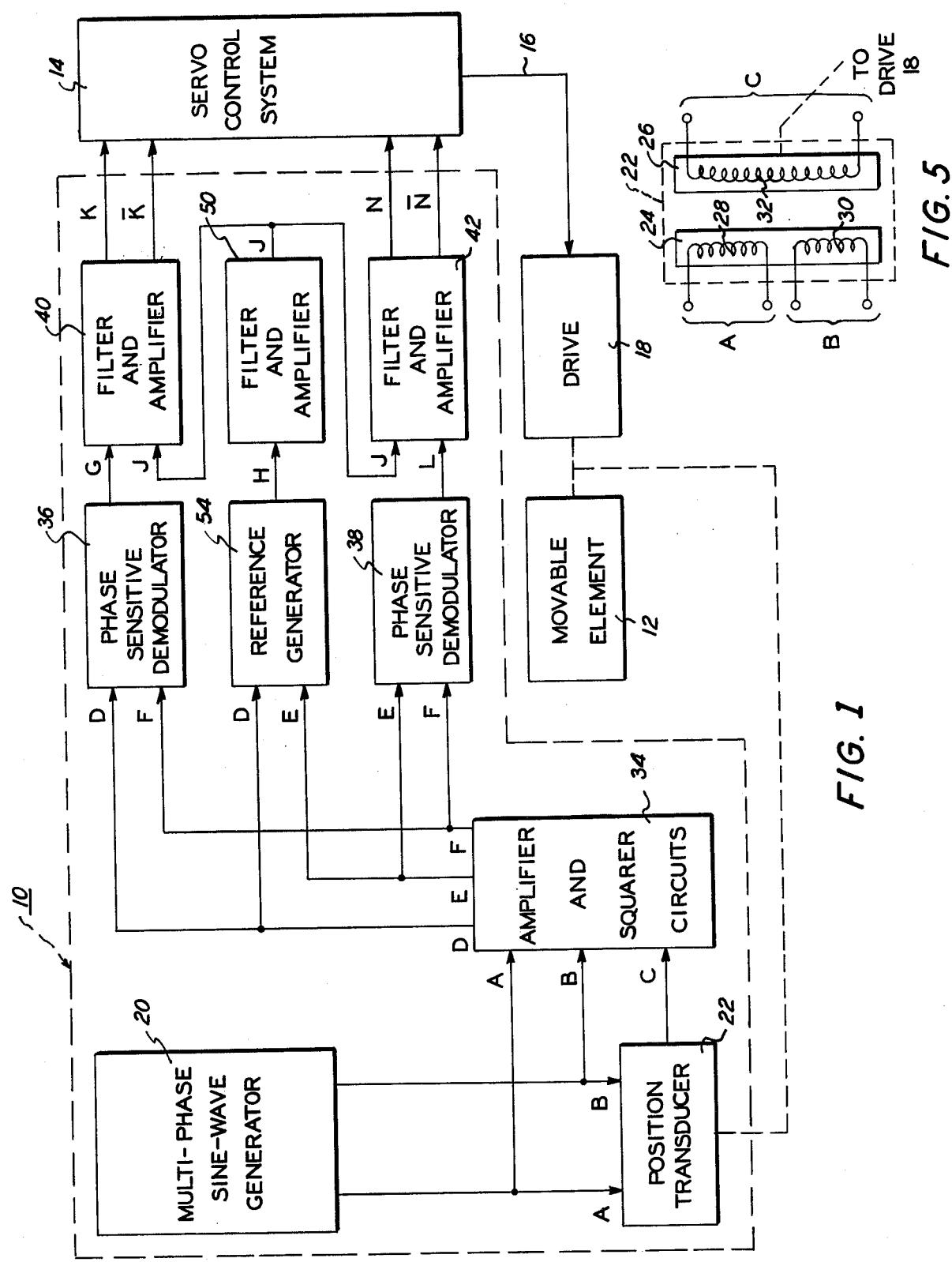
FIG. 1 is a block diagram representation of the present invention as used in conjunction with a servo control system for controlling the movement of a movable element.

Referring to FIG. 1, a phase-sensitive transducer apparatus 10 is shown for generating a plurality of position signals K, $\overline{K}$, N and $\overline{N}$, each representative of the positional movement of a movable element 12. The position signals may be used in or with any suitable apparatus or system requiring as an input a signal or signals representative of the positional movement of the movable element 12. For example, and as shown in FIG. 1, the position signals K, $\overline{K}$, N and $\overline{N}$ may be coupled to a servo control system 14 which operates upon the position signals to generate an error signal on an output line 16 to control a drive assembly 18, which may include a drive motor and associated driver circuits (both not shown) for moving the movable element 12.

The servo control system 14 may be of any suitable type having the need for any one or more of the position signals as inputs thereto. An example of a servo control system which would operate upon all four position signals is disclosed in U.S. Pat. No. 3,839,665. As shown in that patent, an exemplary movable element to be controlled may include the head carriage of a disc drive device. It is clear, however, that the movable element 12 could be any element capable of controlled movement along a prescribed path. Other examples are a rotatable print wheel and a print carriage of the type employed in a serial printer, such as disclosed in U.S. Pat. No. 3,954,163.

Figure 3A:
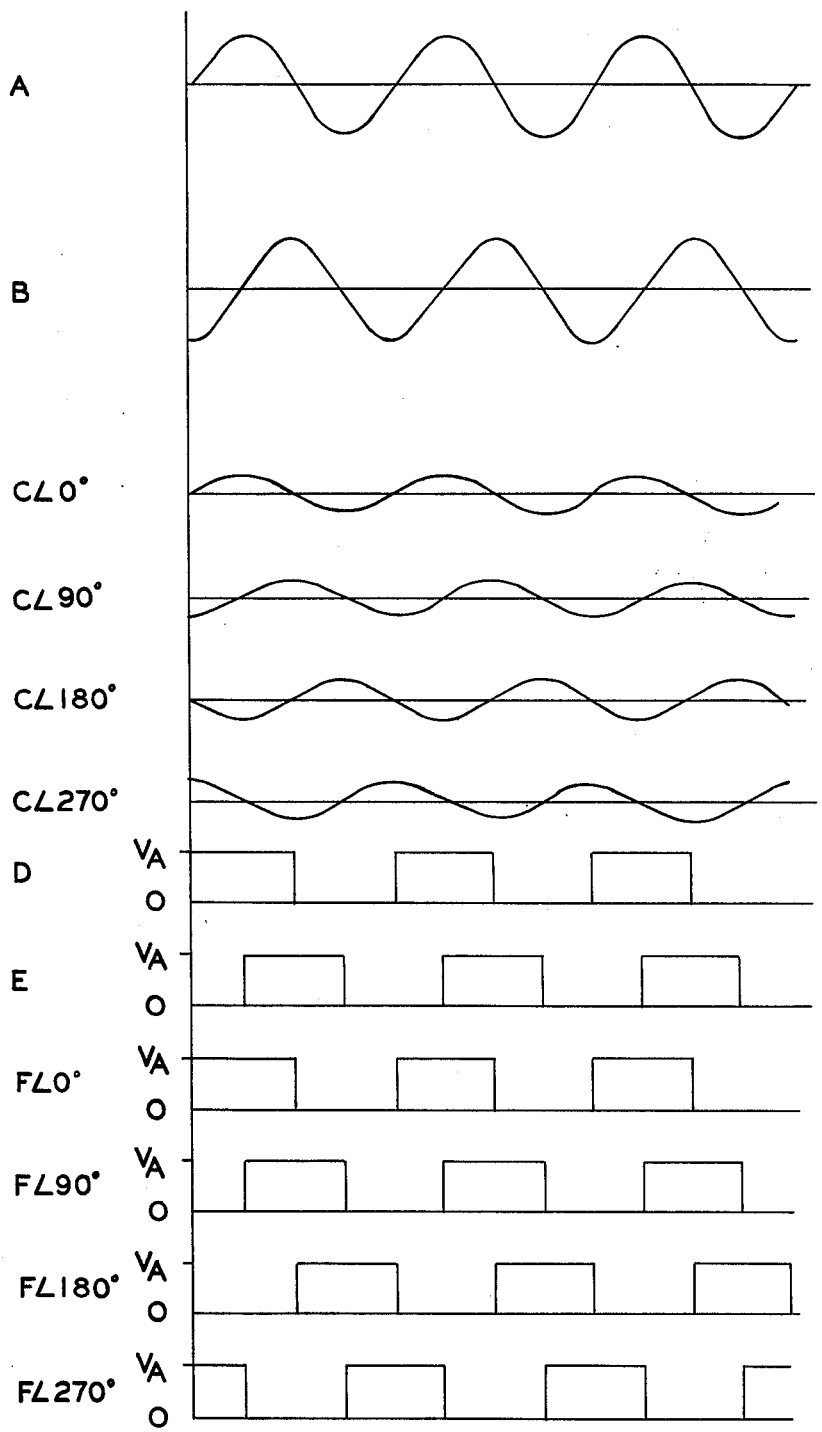
FIGS. 3A and 3B depict idealized waveforms for various of the signals noted in FIGS. 1 and 2.

As shown in FIG. 1, the phase-sensitive transducer apparatus 10 comprises a multi-phase sine-wave generator 20 which may be of any well-known conventional type capable of generating a plurality of mutually phase-displaced sine-wave signals. A presently preferred multi-phase sine-wave generator is a quadrature oscillator capable of generating a pair of 90° phase-displaced sine-wave signals A and B, as shown in FIG. 3A. Quadrature oscillators of this type are entirely conventional and well known and thus will not be described in detail herein.

The two 90° phase-displaced sinusoidal signals A and B are forwarded to a position transducer 22 which operates upon these signals to generate an output signal C which is substantially constant in peak amplitude, but variable in phase during movement of the movable element 12. The variable phase relationship is shown diagramatically in FIG. 3A by signals $C\angle 0°$ – $C\angle 270°$, which represent what the phase relationship of signal C would be at various spaced positions of the movable element 12 corresponding to 90° phase shifts in the signal C. The use of 90° phase shifts is, of course, merely exemplary.

Referring for a moment to FIG. 5, a presently preferred position transducer 22 includes a pair of relatively movable members, such as a scale 24 and a slider 26, wherein the scale 24 is fixed in position by suitable means (not shown) and the slider 26 is kinematically coupled by suitable means (also not shown) to drive 18 for movement synchronously with movement of the movable element 12. The scale 24 comprises a plurality of windings displaced in space phase. Desirably, the scale 24 comprises two windings 28 and 30 displaced in space-quadrature, i.e. 90° space phase. The slider 26 has a single winding 32. The signals A and B developed by the generator 22 are respectively coupled to the scale windings 28 and 30 and the signal C is developed from the single slider winding 32. Movement of the slider 26 relative to the scale 24 corresponds to movement of the movable element 12 and causes the constant amplitude variable phase signal C to be developed. The relative positional relationship of the windings 28 and 30 relative to the winding 32 determines the phase of the signal C, as is conventional and is more completely described in U.S. Pat. No. 3,191,010.

The signal C from the position transducer 22 and the signals A and B from the generator 20 are each applied to individual amplifier and squarer circuits, shown collectively by way of convenience as a single block 34 in FIG. 1. The amplifier and squarer circuits 34 convert the sinusoidal signals A, B and C to respective square-wave signals D, E and F. As used herein, the term "square-wave" shall be deemed to include both square and rectangular waveforms. It will be noted in FIG. 3A that signal D has the same frequency and phase as signal A and signal E has the same frequency and phase as signal B. Thus, signals D and E are 90° phase-displaced. With respect to signal F, it, like signal C, has a constant amplitude and is variable in phase during movement of the movable element 12 and thus movement of the slider 26 relative to the scale 24. Again, such variation in phase is shown diagrammatically by showing what the phase relationship of signal F would be at each of 4, 90° phase-shifted positions. As with signal C, signal F would be constant phase if the movable element 12, and thus the slider 26, were stationary.

The amplifier and squarer circuits 34 may be of any well known, conventional type. An examplary amplifier and squarer circuit that could be used for the conversion of the signals A, B and C to the signals D, E and F (one such circuit for each such conversion) is disclosed in the above-mentioned copending application Ser. No. 670,463. As shown in FIG. 3A, which, by the way, depicts idealized waveforms, it is preferred that the peak amplitude of the signals D, E and F all be substantially at the same level, i.e. $V_A$. This would be possible if the identical amplifier and squarer circuits were utilized, such as the one disclosed in application Ser. No. 670,463, wherein the power supply bias used to determine the peak amplitude of the square-waves is at the level, $V_A$.

As indicated previously, the servo control system 14 is preferably of a type requiring as inputs the four position signals K, $\overline{K}$, N and $\overline{N}$. To this end, the signal F is applied from its associated amplifier and squarer circuit 34 to one input of each of two substantially identical phase-sensitive demodulators 36 and 38. As will be described in more detail below in connection with FIG. 2, the demodulator 36 compares the signal F as against the signal D and the demodulator 38 compares the signal F as against the signal E. In response to such comparison, the demodulators 36 and 38 respectively generate signals G and L (FIG. 3B), which may be characterized as two 90° phase-displaced pulse signals each having the same constant peak amplitude, i.e. $V_A$, with a pulse width that is variable in response to movement of the movable element 12, and thus the slider 26.

Figure 3B:
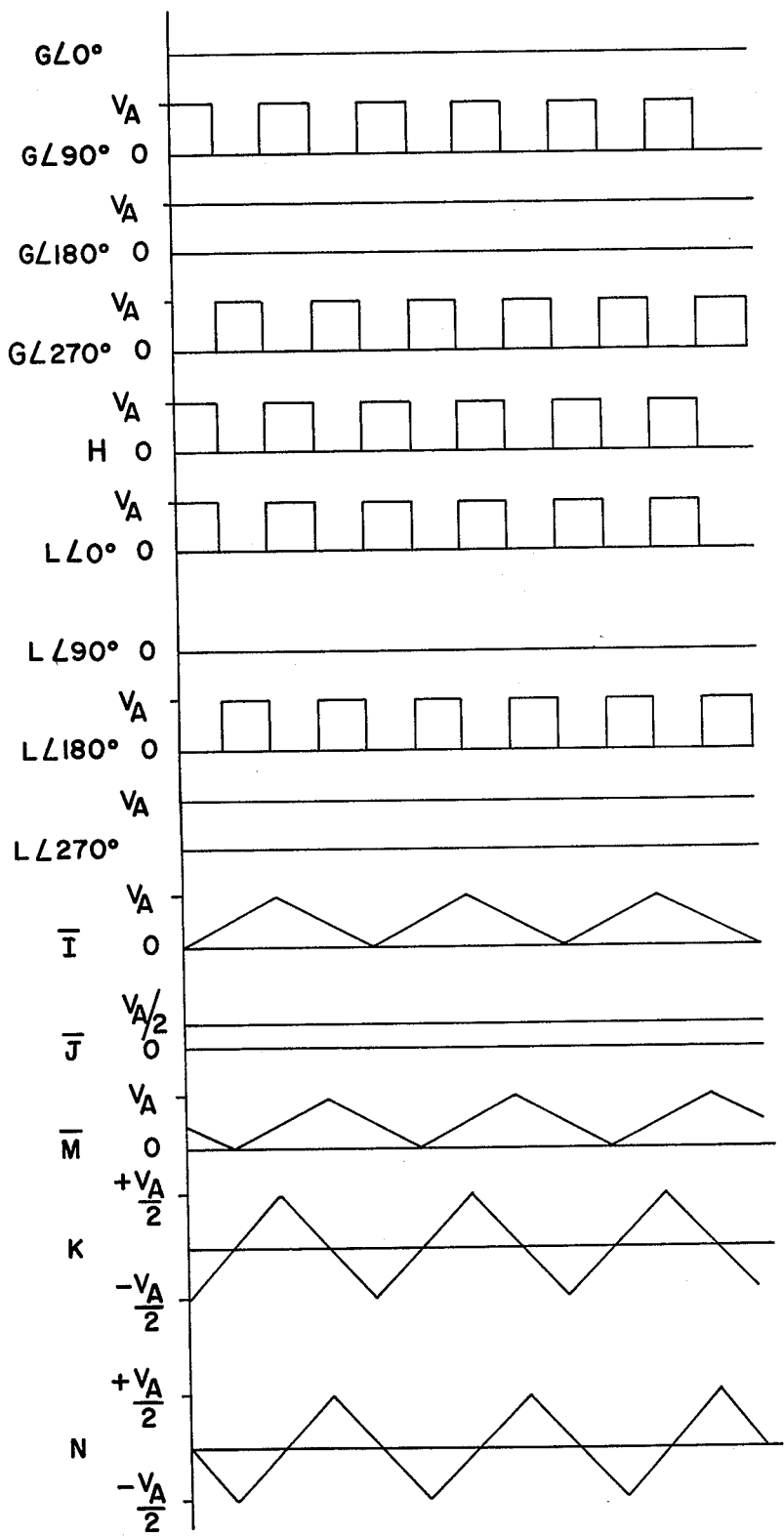

As shown in FIG. 3B, the signals G and L, like signal F, are shown in idealized format at various stages of movement of the movable element 12 corresponding to slider positions defining 90° phase-shifts in the signals C and F. The variance in pulse width will be noted as the slider is moved, i.e. the pulse width of signal G will vary from a maximum (infinite) at $G\angle 180°$ to a minimum (zero) at $G\angle 0°$, whereas the pulse width of signal L will vary from a maximum (infinite) at $L\angle 270°$ to a minimum (zero) at $L\angle 90°$. Should the slider 26 and thus movable element 12 be fixed, each of the signals G and L would have a constant pulse width, the extent of which would be determined entirely by the relative positional relationship between the scale windings 28 and 30 and the slider winding 32.

The signals G and L are respectively coupled to a pair of filter and amplifier circuits 40 and 42 which are desirably substantially identical and which filter, offset and amplify the signals G and L to derive the position signals K and $\overline{K}$, and N and $\overline{N}$, respectively. The specific manner by which this is accomplished and the nature of the position signals K, $\overline{K}$, N and $\overline{N}$ will be more completely described below. At this point, however, it will be noted with reference to FIG. 3B that the position signals desirably have a triangular waveform in response to movement of the movable element 12, wherein each positive and/or negative peak, or every one or every other zero-crossing can be used to detect progressive movement of the movable element 12.

Figure 2:
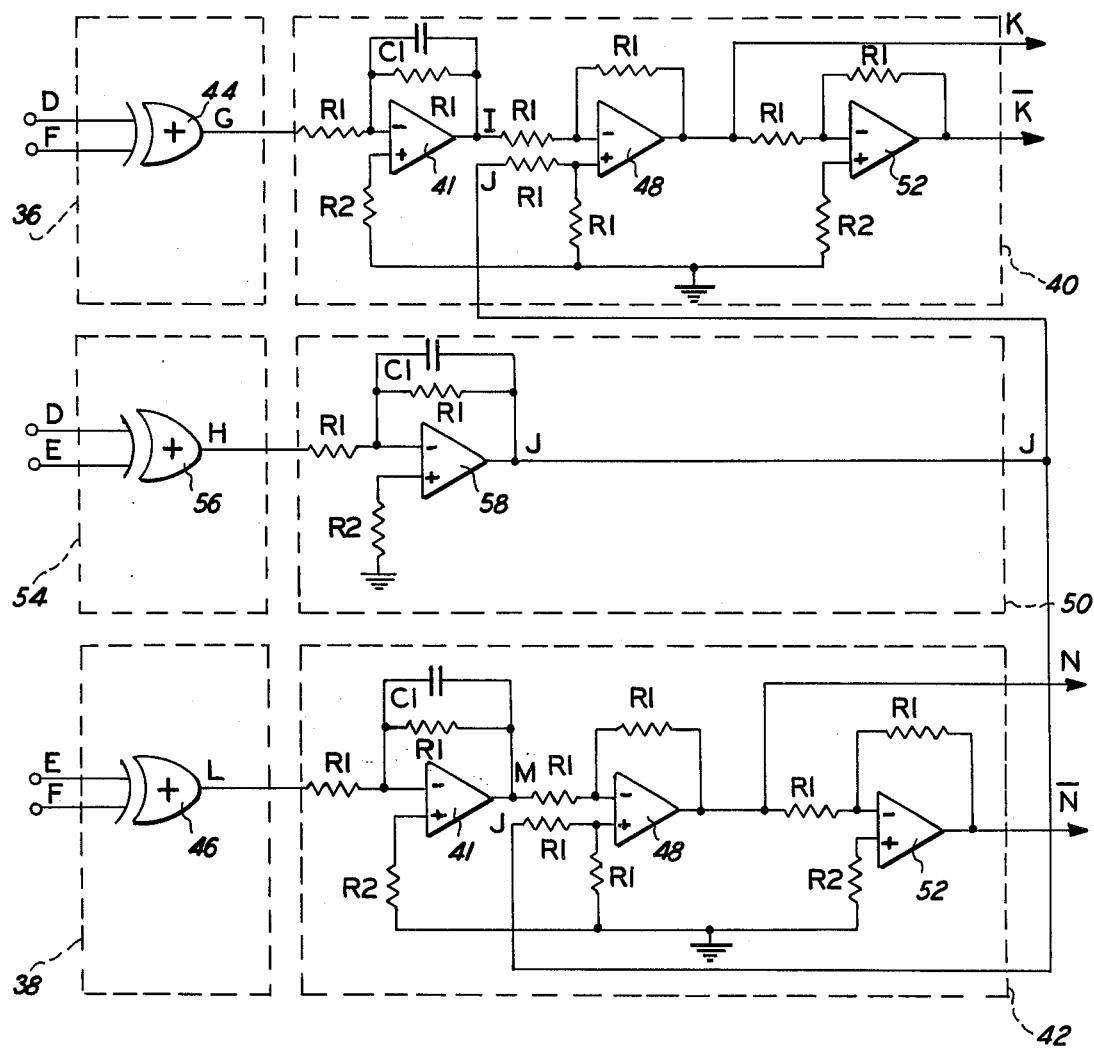
FIG. 2 is a detailed schematic diagram of various components of the present invention as shown in FIG. 1.

Referring now to FIG. 2, the phase-sensitive demodulators 36 and 38 are each preferably comprised by an Exclusive OR-gate 44 and 46, respectively. The gates are preferably comprised by matched components for reasons to be discussed below. The Exclusive OR-gate 44 has a pair of input terminals for respectively receiving the signals D and F from the associated amplifier and squarer circuits 34. Similarly, the Exclusive OR-gate 46 has a pair of input terminals for respectively receiving the signals E and F from the associated amplifier and squarer circuits 34. In operation, the Exclusive OR-gates 44 and 46 will each produce a high output whenever, and only if, the two inputs differ, and a low output whenever, and only if, the two outputs are the same. The resultant output signals G and L are shown in FIG. 3B where, as indicated earlier, they are each shown in idealized form and, by way of convenience, at varying positions of the scale windings 28 and 30 relative to the slider winding 32, which positions correspond to 90° phase-displacements of the signal.

Still referring to FIG. 2, the filter and amplifier circuits 40 and 42 are preferably identical in all respects and so only one will be described in detail. In such description, like components will be designated by the same reference indication. Thus, the circuit 40 includes a unity gain low-pass filter comprised of a capacitor C1 in parallel with a resistor R1 and coupled between a first input of an amplifier 41 and the output thereof. The signal G from the Exclusive OR-gate 44 is applied through another resistor R1 to the first input of the amplifier 41. A second input of the amplifier 41 is connected to ground through a resistor R2, desirably equal to ½ R1.

A signal I (shown as Ī in FIG. 3B) developed at the output of amplifier 41 is coupled through another resistor R1 to one input of a comparator 48, desirably in the form of a differential amplifier. A second input of the comparator 48 is coupled through still another resistor R1 to the output of another filter and amplifier circuit 50 for a purpose to be described in detail below, and through yet another resistor R1 to ground. The output of the comparator 48 represents the signal K shown in FIG. 3B. As is conventional, the output of comparator 48 is fedback through a resistor R1 to the first input thereof.

The signal K at the output of the comparator 48 is also coupled through another resistor R1 to a first input of a unity gain inverting amplifier 52. A second input of that amplifier is grounded through a resistor R2. The output of the amplifier 52 represents the signal $\overline{K}$ and, as is conventional, the output is fedback to the first input through another resistor R1. The signal K as shown in FIG. 3B is idealized in the sense that it is derived from the signal G, whose pulses are shown in FIG. 3B in idealized format. The significance of this will be explained in more detail below.

Although only circuit 40 has been described in detail, it should be noted that a signal M (shown as $\overline{M}$ in FIG. 3B) is developed at the output of the low pass filter of circuit 42, which is 90° phase-displaced from signal I, since the circuit 42 receives the signal L from the Exclusive OR-gate 46, which signal is 90° phase-shifted from signal G. Additionally, the circuit 42 generates different output signals N and $\overline{N}$, although in a manner entirely equivalent to the generation of signals K and $\overline{K}$ by circuit 40. Signal N is shown in FIG. 3B.

Before describing the operation of the circuits 40 and 42, it is necessary to discuss the significance and manner of generation of the signal that is applied to the second inputs of the comparators 48 in circuits 40 and 42. This signal, signal J, is depicted in ideal format as J in FIG. 3B.

Referring then to FIGS. 1 and 2, a reference generator 54 is included in the phase-sensitive transducer apparatus 10. It is coupled to the amplifier and squarer circuits 34 that convert the signals A and B to signals D and E, respectively. More specifically, it compares the signals D and E and generates a signal H at its output in responsive to such comparison. Desirably, the reference generator 54 is comprised of an Exclusive OR-gate 56 that is matched in all respects with both Exclusive OR-gates 44 and 46, i.e. all three Exclusive OR-gates are preferably matched. The Exclusive OR-gate 56 has first and second inputs for respectively receiving the signals D and E and an output at which the signal H is developed. As shown in FIG. 3B, signal H is a pulse signal of constant peak amplitude ($V_A$), frequency and phase. Since the signals D and E are desirably 90° out-of-phase, then the signal H desirably has a 50% duty cycle.

The filter and amplifier circuit 50 includes a unity gain low-pass filter comprised of a capacitor C1 in parallel with a resistor R1 and coupled between a first input of an amplifier 58 and the output thereof. Desirably, the amplifier 58 is identical to the amplifiers 41 of circuits 40 and 42. The signal H from the output of the Exclusive OR-gate 56 is applied through a resistor R1 to the first input of amplifier 58. A second input of the amplifier 58 is grounded through a resistor R2. The output of amplifier 58, i.e. signal J, is coupled through a resistor R1 to the second input of comparator 48 of both circuits 40 and 42, as indicated above.

Referring to FIG. 3B, it will be noted that the signal J represents the d-c average of the signal H. Where the pulses of signal H are idealized, as shown in FIG. 3B, the d-c average will be precisely equal to the peak amplitude of signal H, i.e. $V_A$, divided by two. Signal J may be generally considered a d-c reference signal having a voltage level representative of the d-c average of the pulse signal H. Since the signal H is representative of the condition that its two inputs are 90° out-of-phase, the voltage level of signal J will be substantially equal to the voltage level of signal Ī when the input signals D and F to Exclusive OR-gate 44 are 90° out-of-phase, and substantially equal to the signal $\overline{M}$ when the input signals E and F to Exclusive OR-gate 46 are 90° out-of-phase. The benefits of this relationship form an important aspect of the present invention, as will become clear below.

Referring again to FIG. 2, the precise manner in which the position signals K, $\overline{K}$, N and $\overline{N}$ are generated will be described. The output signal G from the Exclusive OR-gate 44 is filtered by the unity gain low-pass filter (C1, R1, 41, R1) of circuit 40 to generage the position signal I which, as shown in FIG. 3B, represents the locus of points defining the d-c average of the signal G during movement of the slider 26 relative to the scale 24. If the slider 26 were not moved relative to the scale 24, then the d-c average of the signal G would be at a constant voltage level. The position signal I that is generated during relative movement of the slider 26 and scale 24 will ideally have a negative peak amplitude of $-V_A$, a positive peak of zero volts and a frequency directly proportional to the speed of relative movement between the slider 26 and scale 24.

The signal I is then compared in comparator 48 of circuit 40 with the signal J. As stated above, signal $\overline{J}$ represents the d-c average of signal H. Since signal H has a constant 50% duty cycle, signal $\overline{J}$ is a constant d-c level which ideally equals $V_A/2$. Ideally, the d-c average of signal G will be at $V_A/2$ when it is at a 50% duty cycle, i.e. when the slider 26 is moved to a location relative to scale 26 such that the signal F is 90° out-of-phase with the signal D. The comparator 48 causes the signal I to be offset by the d-c voltage level of signal J so that the points on the signal I that correspond to the signals D and F being 90° out-of-phase will be at zero voltage in the offset position signal K, as shown in FIG. 3B. Of course, the peak-to-peak voltage of signal K will be equal to the peak-to-peak voltage of signal I, as determined by the unity gain of the comparator amplifier 48.

The signal M developed at the low-pass filter (C1, R1, 41, R1) of circuit 42 is compared in the comparator 48 of that circuit with the signal J. Ideally, and as with the signal G, the d-c average of signal L will be at $V_A/2$ when it is at a 50% duty cycle, i.e. when the slider 26 has reached a position relative to the scale 24 such that the signal F is 90° phase-displaced from the signal E. The comparator 48 of circuit 42 causes the signal M to be offset by the d-c voltage level of signal J (ideally $-V_A/2$), so that the points on the signal M that correspond to the signals E and F being 90° out-of-phase will be at zero voltage in the offset position signal N, as shown in FIG. 3B.

Figure 4:
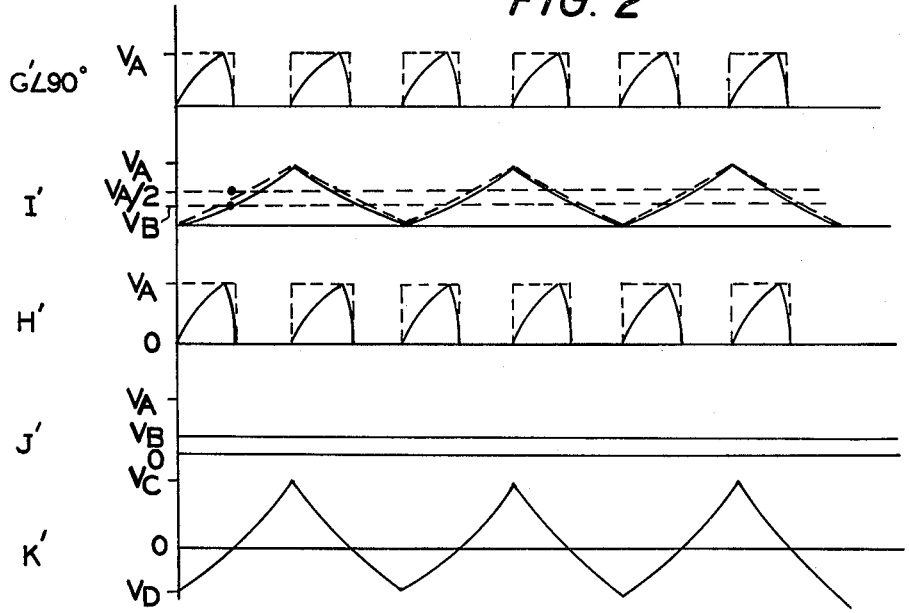
FIG. 4 depicts various non-idealized waveforms for various of the signals noted in FIGS. 1 and 2.

Suppose now that the pulses generated for signals G and L were not ideal, e.g. they have different rise times and fall times. Referring to FIG. 4, a signal G′ is shown at one representative relative position, e.g. G′∠90°, where the pulses are shown to rise slower then they fall. The d-c average of signal G′ at this particular angular position, i.e. signals D and F are 90° phase-displaced, should ideally be $V_A/2$ since the signal G′ has a 50% duty cycle at this position. However, due to the above non-ideality in signal G′, the actual d-c average of signal G′ will be somewhat less than $V_A/2$, e.g. $V_B$. It will be appreciated that errors might thereby arise if it were attempted to offset the signal I′ by $V_A/2$ (ideal), instead of $V_B$ (actual), which would be required to insure that the points on the offset position signal K′ (FIG. 4) corresponding to the signals D and F being 90° out-of-phase would occur at zero voltage.

In accordance with the invention, the d-c reference signal J that is used to establish the offset voltage has a level which always represents the d-c average of signal H and thus is always representative of a condition where the signals D and F are 90° out-of-phase and the signals E and F are 90° out-of-phase. Now then, by insuring that the Exclusive OR-gates 44, 46 and 56 are all matched, it will be appreciated that whatever non-idealities are present with respect to the pulses of signal G′, for example, they will likewise and identically be present with respect to signal J′. Accordingly, if the d-c average of signal G′ at the 90° phase-displaced condition of signals D and F is less than $V_A/2$, i.e. $V_B$, the d-c average of signal J′ will be substantially equal to $V_B$ so that when they are compared by the comparator 48 of circuit 40, the resultant signal K′ at these 90° phase-displaced conditions of signals D and F will be at zero voltage (see FIG. 4.)

As indicated previously, all three amplifier and squarer circuits 34 are desirably identical and contain matched components so that any idealities that occur in the generation of the square-wave signals D, E and F will be equally present in each. For similar reasons, the low-pass filters of circuits 40, 42, and 50 are desirably identical and contain matched components. It will thus be appreciated that any variations in the amplitude of the power supply voltage, $V_A$, or any ripple or noise superimposed thereon, will have no effect on the location of the null points in the signals K, $\overline{K}$, N and $\overline{N}$. Further, even if the signals A and B are not precisely 90° out-of-phase, e.g. 89° out-of-phase, the null points of the signals K, $\overline{K}$, N and $\overline{N}$ will remain unchanged relative to their locations for a true 90° phase displacement condition.

Although the invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A phase-sensitive transducer apparatus comprising:
   first and second relatively movable members, said first relatively movable member having a plurality of windings and said second relatively movable member having a winding;
   means for applying a first input signal to one of the windings of said first relatively movable member and a second input signal to another of the windings of said first relatively movable member, an output signal being developed on the winding of said second relatively movable member, said first and second input signals being sinusoidal in nature of substantially identical frequency and peak amplitude and being phase-displaced by a predetermined amount, and said output signal being substantially constant in peak amplitude and variable in phase during relative movement of said first and second relatively movable members;
   means responsive to said first input signal and to said output signal for generating a position signal indicative of the relative movement of said first and second relatively movable members, said position signal alternating during such relative movement between first and second voltage levels;
   means responsive to said first input signal and to said second input signal for generating a d-c reference signal having a voltage level substantially equal to the voltage level of said position signal when said first input signal and said output signal are phase-displaced by said predetermined amount; and
   comparator means responsive to said position signal and to said d-c reference signal for offsetting said position signal by an amount represented by the voltage level of said d-c reference signal.

2. The apparatus of claim 1, further comprising:
   means coupled to said means for applying for squaring said first and second input signals; and
   means coupled to the winding of said second relatively movable member for squaring said output signal.

3. The apparatus of claim 2, wherein said means for generating a position signal comprises:
   gate means having a first input adapted to receive said squared first input signal, a second input adapted to receive said squared output signal, and an output for generating a pulse signal of constant peak amplitude and variable pulse width as said first and second relatively movable members are moved relative to one another; and means coupled to the output of said gate means for filtering said pulse signal to generate said position signal.

4. The apparatus of claim 3, wherein said means for filtering includes a low pass filter capable of generating the d-c average of said pulse signal which, during relative movement of said first and second relatively movable members, defines a locus of points constituting said position signal.

5. The apparatus of claim 3, wherein said gate means includes an Exclusive OR-gate.

6. The apparatus of claim 2, wherein said means for generating a d-c reference signal comprises:

gate means having a first input adapted to receive said squared first input signal, a second input adapted to receive said squared second input signal, and an output for generating a pulse signal of constant peak amplitude and constant pulse width as said first and second relatively movable members are moved relative to one another; and means coupled to the output of said gate means for filtering said pulse signal to generate said d-c reference signal.

7. The apparatus of claim 6, wherein said means for filtering includes a low pass filter capable of generating the d-c average of said pulse signal.

8. The apparatus of claim 6, wherein said gate means includes an Exclusive OR-gate.

9. The apparatus of claim 2, wherein:

said means for generating a position signal comprises first gate means having a first input adapted to receive said squared first input signal, a second input adapted to receive said squared output signal, and an output for generating a first pulse signal of constant peak amplitude and variable pulse width as said first and second relatively movable members are moved relative to one another; and first filter means coupled to the output of said first gate means for filtering said first pulse signal to generate said position signal; and said means for generating a d-c reference signal comprises second gate having a first input adapted to receive said squared first input signal, a second input adapted to receive said squared second input signal, and an output for generating a second pulse signal of constant peak amplitude and constant pulse width as said first and second relatively movable members are moved relative to one another; and second filter means coupled to the output of said second gate means for filtering said second pulse signal to generate said d-c reference signal.

10. The apparatus of claim 9, wherein said first filter means includes a first low pass filter capable of generating the d-c average of said first pulse signal which, during relative movement of said first and second relatively movable members, defines a locus of points constituting said position signal.

11. The apparatus of claim 10, wherein said second filter means includes a second low pass filter capable of generating the d-c average of said second pulse signal.

12. The apparatus of claim 9, wherein said first and second gate means each comprise an Exclusive OR-gate.

13. The apparatus of claim 12, wherein the Exclusive OR-gate of said first and second gate means are matched.

14. The apparatus of claim 11, wherein said first and second gate means are respectively comprised by a pair of matched Exclusive OR-gates.

15. The apparatus of claim 1, wherein said first and second relatively movable members respectively comprise a scale and a slider, wherein said scale has a pair of windings displaced in space phase and respectively adapted to receive said first and second input signals, and said slider has a single winding adapted to generate said output signal.

16. The apparatus of claim 1, wherein said means for applying includes a quadrature oscillator, wherein said predetermined amount is 90°.

17. The apparatus of claim 14, wherein said means for applying includes a quadrature oscillator, wherein said predetermined amount is 90°.

18. The apparatus of claim 17, wherein said second pulse signal has a 50% duty cycle.

19. The apparatus of claim 18, wherein said first and second relatively movable members respectively comprise a scale and a slider, wherein said scale has a pair of windings displaced in space-quadrature and respectively adapted to receive said first and second input signals, and said slider has a single winding adpated to generate said output signal.

* * * * *